United States Patent
Tokura et al.

[11] 3,909,801
[45] Sept. 30, 1975

[54] PROGRAM CONTROL DEVICE

[75] Inventors: Yasufumi Tokura, Kairya; Kazuo Matsuno, Gifu; Itaru Sakurai, Nagoya, all of Japan

[73] Assignee: Toyoda Koki Kabushiki Kaisha, Japan

[22] Filed: Feb. 27, 1974

[21] Appl. No.: 446,407

[30] Foreign Application Priority Data
Feb. 28, 1973  Japan............................ 48-24595

[52] U.S. Cl.......... 340/172.5; 235/151.11; 318/567
[51] Int. Cl.......................... G06f 15/46; B25j 9/00
[58] Field of Search............................ 340/172.5

[56] References Cited
UNITED STATES PATENTS
3,475,732   10/1969   Ausan et al................ 340/172.5

OTHER PUBLICATIONS
"Sequence ROS Control of Computers," IBM Tech. Bulletin, pp. 1299 & 1300, Vol. 14, No. 4, Sept. 1971.

"Program Device," IBM Tech. Bulletin, Vol. 4, No. 12, May 1962.

*Primary Examiner*—Eugene G. Botz
*Attorney, Agent, or Firm*—Oblon, Fisher, Spivak, McClelland & Maier

[57] ABSTRACT

A program control device controls a plurality of power units of a controlled object having operation member means in accordance with program information which is memorized in a memory device. The program information consists of step information and point information. The point information instructs the command positional values of the operation member means. The step information includes a control command to control functions of the program control device and a memory address command to instruct a memory address of the point information to be read out from the memory device. A control device generates operation control signals to control the power units in accordance with the point informations which have been read out from the instructed memory addresses.

9 Claims, 12 Drawing Figures

| MEMORY ADDRESS | 0 | 1 | 2 | 3 | 4 | 5 | 6 | 7 | 8 | 9 | 10 | 11 | 12 | 13 | 14 | 15 | 16 | P |
|---|---|---|---|---|---|---|---|---|---|---|---|---|---|---|---|---|---|---|
| 0 | P | O | T | | | | | | | | | | | ① | | | | |
| 1 | P | O | T | | | | | | | | | | | ② | | | | |
| 2 | | | | | | | | | | R | | | | | | | | |
| 3 | | | | | | | | | | U | | | | | | | | |
| 4 | | | | | | | ① | | | E | | | | | | | | |
| 5 | | | | | | | | | | B | | | | | | | | |
| 6 | | | | | | | | | | S | | | | | | | | |
| 7 | | | | | | | | | | M | | | | | | | | |
| 8 | P | O | T | | | | | | | | | | | ③ | | | | |
| 9 | P | O | T | | | | | | | | | | | ④ | | | | |
| 10 | | | | | | | | | | R | | | | | | | | |
| 11 | | | | | | | | | | U | | | | | | | | |
| 12 | | | | | | | ② | | | E | | | | | | | | |
| 13 | | | | | | | | | | B | | | | | | | | |
| 14 | 2 | 1 | 0 | | | | | | | S | | | | | | | | |
| 15 | | | | | | | | | | M | | | | | | | | |
| 16 | P | O | T | | | | | | | | | | | ⑤ | | | | |
| 17 | P | O | T | | | | | | | | | | | ⑥ | | | | |
| 18 | | | | | | | | | | R | | | | | | | | |
| 19 | | | | | | | | | | U | | | | | | | | |
| 20 | | | | | | | ③ | | | E | | | | | | | | |
| 21 | | | | | | | | | | B | | | | | | | | |
| 22 | | | | | | | | | | S | | | | | | | | |
| 23 | | | | | | | | | | M | | | | | | | | |
| 24 | S | O | N | | | | | | | | | | ⑰⑦⑦ | | | | | |
| 25 | J | M | P | | | | | | | | | | ②⑦⑦ | | | | | |
| 26 | | | | | | | | | | R | | | | | | | | |
| 27 | | | | | | | | | | U | | | | | | | | |
| 28 | | | | | | | ④ | | | E | | | | | | | | |
| 29 | | | | | | | | | | B | | | | | | | | |
| 30 | | | | | | | | | | S | | | | | | | | |
| 31 | | | | | | | | | | M | | | | | | | | |

PROGRAM CONTROL DEVICE

BACKGROUND OF THE INVENTION

1. Field of the Invention

The present invention relates to a program control device which controls a plurality of power units of a controlled object, particularly such as an industrial robot, in accordance with program information so as to perform a desired sequential operation.

2. Description of the Prior Art

The conventional program control device of this type used a magnetic tape or a magnetic drum as a memory element to memorize the positional information of the operational axes in a desired sequential order. In such a case the positional information had to be read in the memorized order. In the industrial robot, however, many kinds of operations are required and the kind of operation is frequently changed. Therefore, it is desirable that the operational cycle and pattern can be easily changed and the same operational pattern can be easily repeated. Generally, there occur many cases of operation such that the manipulator hand of the industrial robot frequently returns to the same positions. However, in the past a considerably large amount of memory space was required of the memory element for memorizing the positional information since the positional information was stored in the memory element in the operational sequence in spite of the repeating movements of the manipulator hand to the same positions. Also, the greater the number of operational axes, the larger is the memory space occupied by the positional information of the operational axes. Such a conventional manner was not advantageous in view of the lack of effective usage of the memory element.

Although an industrial robot having a high degree of freedom is usable for wide operational purposes, the conventional industrial robot could not be provided with enough functions capable of dealing with such wide operational purposes. For example, the number of all of the operation-steps to be performed was about 100 300 in a usual industrial robot provided with the magnetic drum. In an operation having complicated contents it was difficult and complex to provide a large number of steps. Furthermore, when many sorts of operational patterns were required to be performed in such an industrial robot, the operational pattern had to be short or simple, since a large amount of positional information had to be stored in the memory element. Thus, it was difficult for such an industrial robot to perform a wide scope of operations.

SUMMARY OF THE INVENTION

It is, therefore, an object of the present invention to provide a new and improved control device which can give a wide range of functions to a controlled object without requiring a large memory capacity of a memory device.

Another object of the present invention is to provide a new and improved program control device where step information and point information are seperetely memorized and read out, so that the common point information can be repeatedly used in accordance with the step information.

Briefly, according to the present invention, these and other objects are achieved by providing a control device for generating operation control signals to control a plurality of power units of a controlled object having operation member means thereon in accordance with program information, as mentioned below.

A memory device memorizes the program information which consists of step information and point information. The point information indicates the command positional value of the operation member means in each of the operational axes. A step counter instructs a memory address of the step information to the memory device. The step information includes a memory address command to indicate a memory address of the point information and a control command to control functions of the program control device. A point counter instructs a memory address of the point information in accordance with the memory address command. A control signal generating circuit generates control signals in accordance with the control command. A gate circuit selectively connects the step counter and the point counter to the memory device in response to control signals to instruct the memory address of the memory device. A register device registers the command positional values read out from the memory addresses of the memory device instructed in accordance with the memory address commands. Detecting means obtain the actual positional values by detecting the movement of the operation member means. A comparator compares the actual positional values with the command positional values in the operational axes of the operation member means to generate the operation control signals.

BRIEF DESCRIPTION OF THE DRAWINGS

The foregoing and other objects of the present invention will be more fully appreciated as the same becomes better understood from the following description of a preferred embodiment when considered in connection with the accompanying drawings, in which:

FIGS. 3($a$) and 3($b$) are associated block diagrams showing a control circuit according to the present invention;

FIGS. 4($a$) and 4($b$) are associated circuit diagrams, partly broken away, concretely showing the step counter, the point counter and the memory address gate of the control circuit;

DETAILED DESCRIPTION OF A PREFERRED EMBODIMENT

Figure 1:
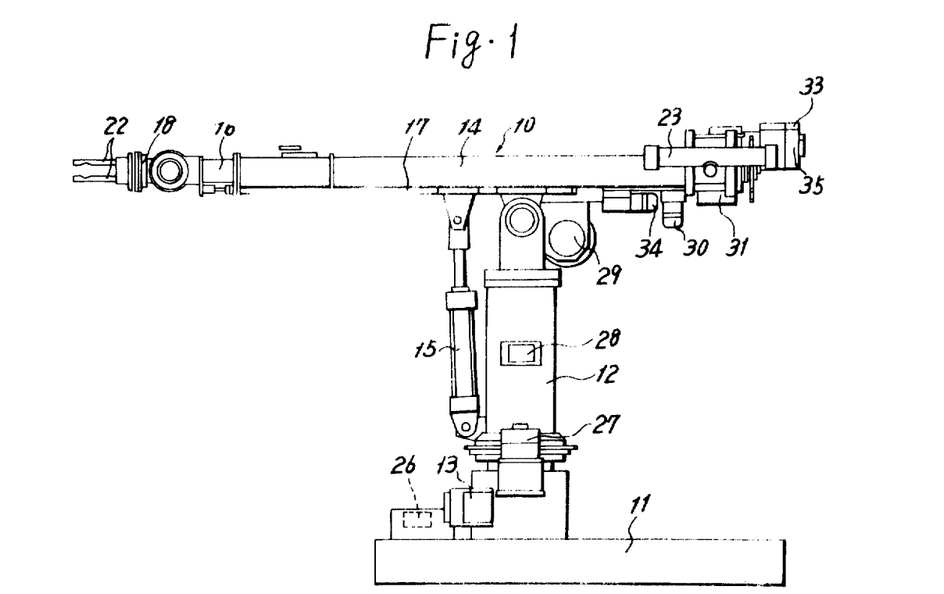
FIG. 1 is a side view showing an industrial robot.
Figure 2:
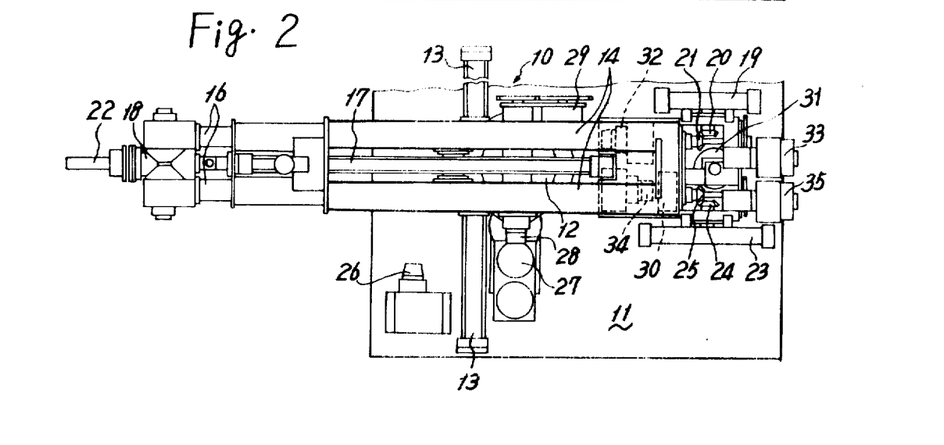
FIG. 2 is a top plan view, partly broken away, showing the industrial robot of FIG. 1.

Referring now the the drawings wherein like reference numerals refer to corresponding or identical parts throughout the several views and more particularly to FIGS. 1 and 2 thereof which show a controlled object, such as, for example, an industrial robot 10, which is controlled by a program control device, shown in the following Figures, of an embodiment according to the present invention.

The industrial robot 10 has a manipulating hand such as finger members 22 to grasp and manipulate an object such as goods or products. The finger members 22 are moved by hydraulic cylinders and servo valves in five operational axes R, U, E, B and S in accordance with programmed numerical information so that a desired sequence of operation may be performed.

The construction of the industrial robot 10 is first described hereunder.

A swivel trunk 12 is mounted on a platform 11 so as to be rotated by a hydraulic actuator 13 about the R axis vertical to the platform 11. An arm support 14 is rotatably mounted on the top of the swivel trunk 12. An up-down cylinder 15 is provided between the swivel trunk 12 and the arm support 14 so as to rotate the arm support 14 about the horizontal U-axis perpendicular to the R-axis. An arm member 16 is slidably mounted on the arm support 14 so as to be extended and reduced by a hydraulic cylinder 17 along the E-axis of the longitudinal direction of the arm support 14. A hand assembly 18 is mounted on the end of the arm member 16 so as to be rotated as a wrist swivel about the B-axis perpendicular to the E-axis by a hydraulic cylinder 19 which is mounted on the rear portion of the arm support 14. The power of the cylinder 18 is transmitted to the hand assembly 18 through a rack and pinion mechanism (not shown), bevel gears 20 and 21 and a spline shaft (not shown) received in one end of the arm member 16. Fingers 22 which are attached to the hand assembly 18 for a usage purpose are twisted about the S-axis perpendicular to the B-axis by a hydraulic cylinder 23 which is mounted on the rear portion of the arm support 14. The power of the cylinder 23 is transmitted to the hand assembly 18 through a rack and pinion mechanism (not shown), bevel gears 24 and 25 and a spline shaft (not shown) rotatably received in the other end of the arm member 16. Pressure fluid is supplied to the hydraulic cylinder 13 from a servo valve 26 to rotate the swivel trunk 12. The actual position of the swivel trunk 12 is detected by an encoder 27 which is rotated by the rotation of the swivel trunk 12 through a gearing. A servo valve 28 supplies pressure fluid to the up-down cylinder 15 for the arm support 14, of which the actual position is detected by an encoder 29. A servo valve 30 supplies pressure fluid to the hydraulic cylinder 17 of the E-axis operation. The actual position of the arm members 16 is detected by an encoder 31 which is operated in response to the longitudinal motion of the arm members 16. A servo valve 32 supplies pressure fluid to the cylinder 19 of the B-axis operation of which the actual position is detected by an encoder 33. A servo valve 34 supplies pressure fluid to the cylinder 23 for the twist operation about the S-axis. An encoder 35 is mounted on the rear portion of the arm support 14 to detect the actual position of the fingers 22.

Figure 3A:
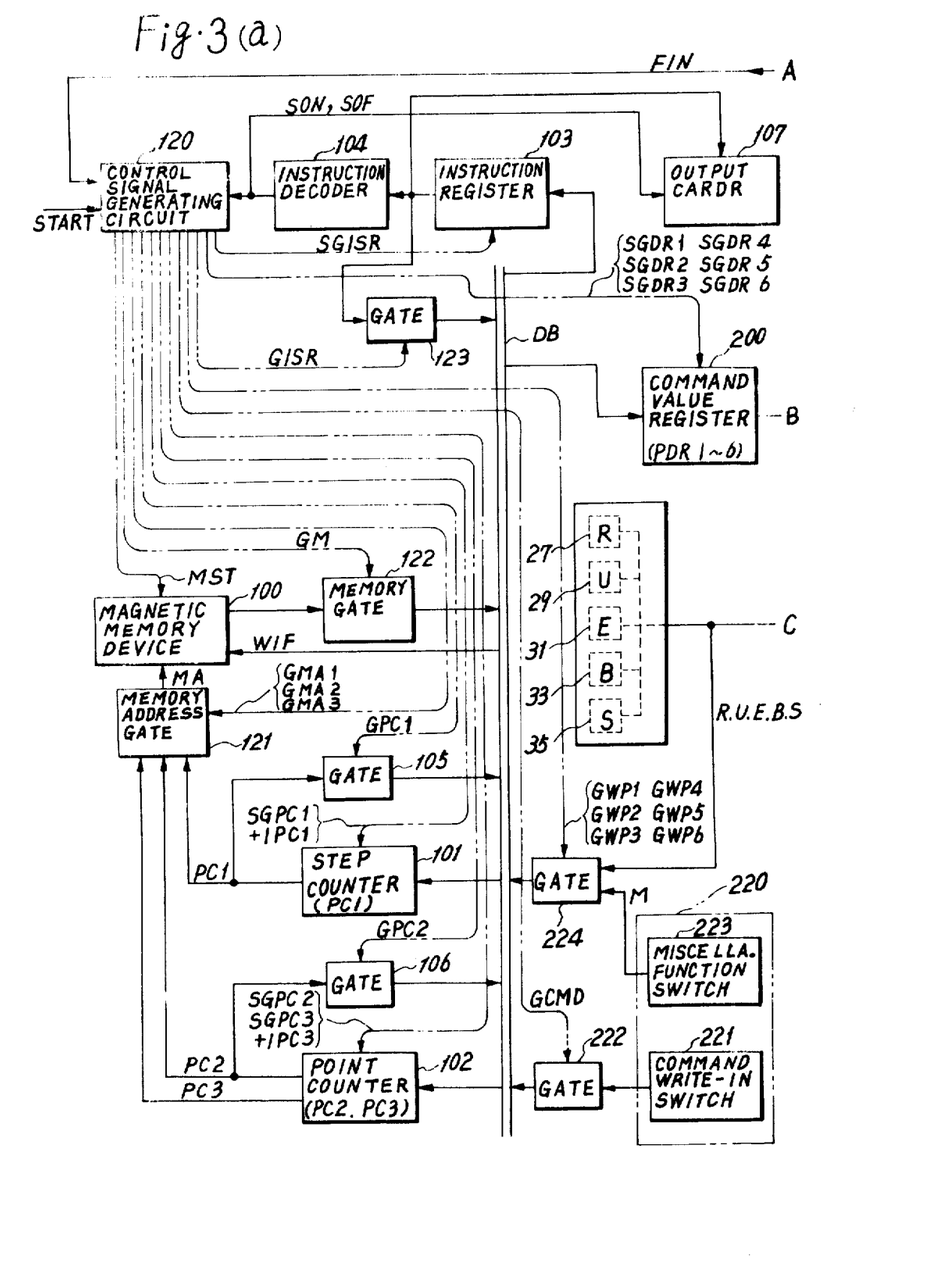
Figure 3B:
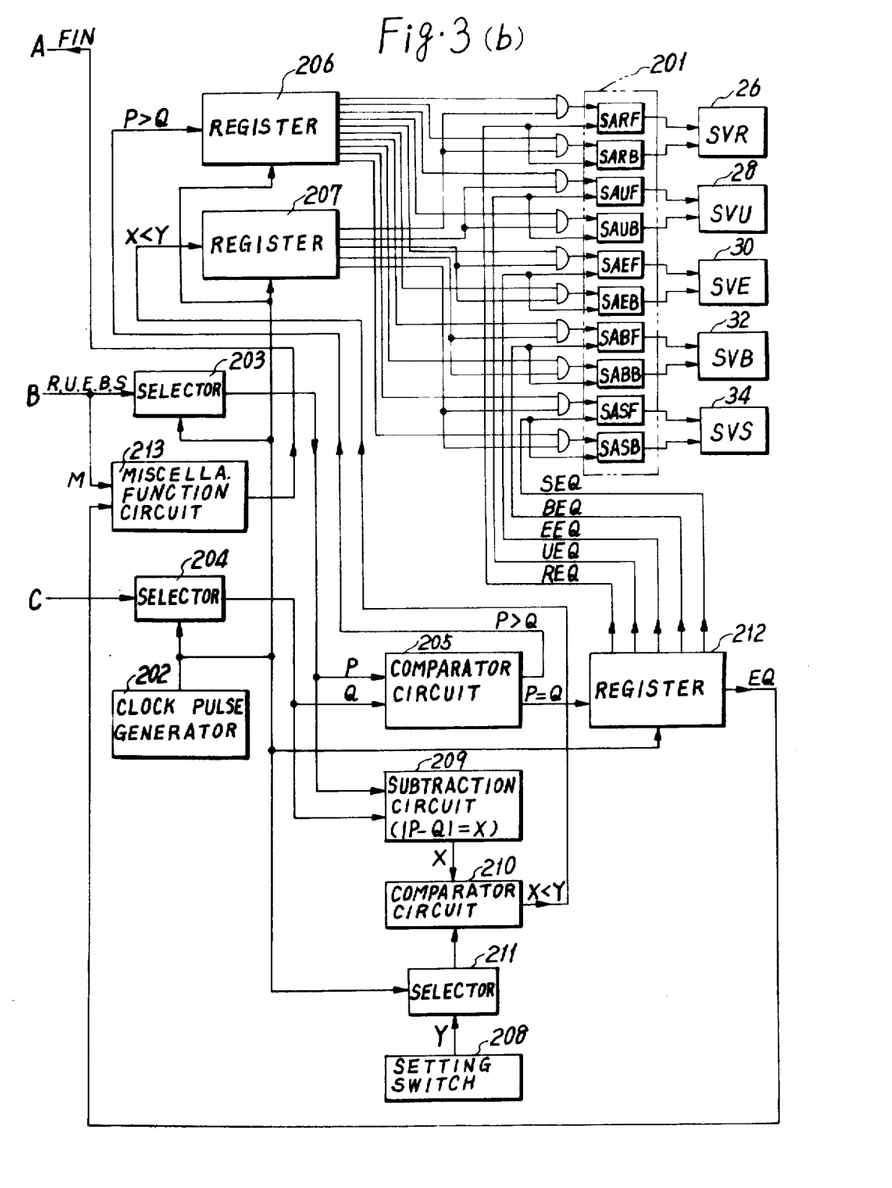

FIGS. 3(a) and 3(b) show a program control device to control the industrial robot 10 in accordance with programmed numerical information as illustrated in FIGS. 5A to 5E. The programmed numerical information consists of step information and point information. The step information is applied to control the function of the program control device. The point information is used to instruct the values of the amount of movement of the five operational axes R, U, E, B and S. The step and point informations are separately stored in a magnetic memory device 100.

Seventeen bits per one word are used for one step or point information and the last, or 17th bit, is used for providing a parity check. The step information consists of a control command and a memory address command. The control command of the step information is written on the 0 to 5th bits, inclusive, The memory address command to instruct the memory address of the point information to be next read out from the magnetic memory device 100 is written on the 6th to 16th bits, inclusive. The control command is identified by an instruction decoder 104. A control signal generating circuit 120 is connected to the instruction decoder 104 for generating each kind of control pulse trains in accordance with the cntrol command.

A step counter 101 is provided to instruct the memory address to the magnetic memory device 100 where the step information is written and stored. A point counter 102 is provided to instruct the memory address in the memory device 100 where the point information is written and stored. The step counter 101 and the point counter 102 are connected to the memory address terminals of the memory device 100 through a memory address gate 121. The memory address gate 121 is connected to the control signal generating circuit 120 and receives gate pulses GMA 1 and GMA 2. When the gate pulse GMA 1 is applied to the memory address gate 121, the memory address is instructed by the step counter 101 to the magnetic memory device 100. When the gate pulse GMA 2 is transmitted to the memory address gate 121, the memory address is instructed by the point counter 102 to the memory device 100. The magnetic memory device 100 is connected to the control signal generating circuit 120 to thereby receive a reading-start signal MST. When the reading-start signal MST is applied to the magnetic memory device 100, the memory device 100 reads out either the step or the point information which is written in the instructed memory address therein. A gate pulse GM is applied to a memory gate 122 from the control signal generating circuit 120 to open the memory gate 122.

When the step information is read out from the instructed memory address it is transmitted to a data bus DB. While the memory gate 122 is opened by the gate pulse GM, a data preset pulse SGISR is applied to an instruction register 103, to which the step information transmitted to the data bus DB is preset.

The memory address command included in the step information is transmitted to the data bus when a gate 123 connected to the instruction register 103 is opened in response to a gate pulse GISR which is transmitted from the control signal generating circuit 120 in accordance with the control command included in the same step information. Then, data preset pulses SGPC2 and SGPC3 are transmitted from the control signal generating circuit 120 to the point counter 102, so that the memory address command preset to the instruction register 103 is transmitted to the point counter 102 through the data bus DB. When the gate pulse GMA2 is applied to the memory address gate 121, the memory address command preset to the point counter 102 is instructed to the memory device 100. The point information corresponding to one word is read out from the instructed memory address in response to the memory start pulse MST. While the gate pulse GM is being applied to the memory gate 122 to open the same, the control signal generating circuit 120 applies a data preset pulse SGDR1 to a command value register 200 and therefore the point information which is first read out and the point information on the amount of movement of R-axis is preset therein. Thereafter, a stepping pulse +1PC3 is transmitted from the control signal generating circuit 120 to the point counter 102 to step the same to proceed the instruction of the memory address by one step. Accordingly, the U-axis command value as a second point information is read out from the instructed memory address in response to the applications of the reading-start pulse MST and the gate pulse GM. The U-axis command value is preset to the command value register 200 in response to a data preset pulse SGDR2. In this manner when five step pulses +1PC3 are applied to the point counter 102, the point information on the operational axes R, U, E, B and S and a miscellaneous function M are read out from the instructed addresses in the memory device 100. Thus, the point information of the command values P which are read out from the memory device 100 are preset to the command value register 200.

A selector 203 is connected to the command value register 200 to select each command value in synchronism with clock pulses which are transmitted from a clock pulse generator 202. Another selector 204 is connected to the encoders 27, 29, 31, 33 and 35 to select each of the values Q of the actual position, which are detected by the encoders, in synchronism with the same clock pulses that are applied to the selector 203. The selected command value and the selected actual position value are applied to both a main comapator circuit 205 and a subtraction circuit 209. The main comparator circuit 205 is connected to a register 206 which is set when the command values P are more than the actual positional values Q and is reset when the command positional values P are less than the actual position values Q. The register 206 comprises a plurality of flip-flop circuits (not shown) to memorize the large and small relationship between the values P and Q with respect to the operational axes R, U, E, B and S. The output terminal of the set side of each of the flip-flop circuits is connected through an AND gate to the operation start input terminal of each of servo amplifiers SARF, SAUF, SAEF, SABF and SASF which control a forward operation in the operational axes. The output terminal of the reset side of each of the flip-flop circuits is connected through an AND gate to the operation start input terminal of each of the servo amplifiers SARB, SAUB, SAEB, SABB and SASB which command a backward operation in the operational axes.

The other input terminals of the above described AND gates are connected to a register 207 which comprises a plurality of flip-flop circuits (not shown) and is reset in accordance with a slowdown signal, described hereinafter. The subtraction circuit 209 operates to calculate a subtraction value $X = |P - Q|$ in each of the operational axes. The subtraction circuit 209 is connected to a comparator circuit 210 to feed the subtraction value X to the same. The comparator circuit 210 is connected to a setting switch 208 through a selector 211 for comparing the subtraction value X with a preset value Y. The preset value Y is preset by the setting switch 208 in accordance with a predetermined start position of slowdown in each of the operational axes. The selector 211 selects the preset value of each operational axis in synchronism with the same clock pulses that are applied to the selectors 203 and 204. The comparator circuit 210 is connected to the register 207 to reset the same when the subtration value X becomes less than the preset value Y. When the register 207 is reset, the slowdown signal is transmitted from the registr 207 to the AND gate to close the same. Then, the output voltage of the servo amplifier 201 is decreased to a voltage corresponding to a creep velocity by means of integrating elements therein. The servo valves 26, 28, 30, 32, and 34 control the flow of pressure fluid which is applied to the hydraulic cylinders 13, 15, 17, 19, and 23 in response to the decreasing output voltage so as to decrease the velocities of movement of the operational axes R, U, E, B and S, respectively.

The other input terminal of each of the servo amplifiers 201 is connected to a register 212 which comprises a plurality of flip-flop circuits (not shown). When the command positional value P becomes equal to the actual positional value Q with respect to each of operational axes, the register 212 is set to thereby transmit coincidential signals REQ, UEQ, EEQ, BEQ and SEQ to the servo amplifier 201. The servo amplifiers 201 shut off the energizing current of the coils of the servo valves in response to the coincidental signals, so that the operation of the hydraulic cylinder of each of the operational axes is stopped. Thus, the fingers 22 are positioned to a desired position which is commanded by the point informations. When the command value P accords with the actual position value Q in all of the operational axes, a coincidental signal EQ is generated to be applied to a miscellaneous function circuit 213. Each kind of miscellaneous function, such as the opening of fingers 22, is sequentially performed. When all instructed miscellaneous functions are accomplished, a miscellaneous function finish signal FIN is generated to be applied to the control signal generating circuit 120, which transmits a step pulse +1PC to the step counter 101. The next step information is read out from a new memory address in response to the step pulse +PC1 to perform such an operation as mentioned above, i.e., the decoding of step information, the address-instructing of point information, the reading-out of point information, the presetting of point information to the command value register and the controlling of hydraulic cylinders for each operation axis. Thus, the industrial robot 10 is controlled in accordance with the program information.

The registers 206, 207, and 212 memorize the following relationships:

$$P<Q, P>Q; X<Y; \text{ and } P=Q$$

in each of the operational axes, respectively. These relationships are memorized in the set state or the reset state of each of the flip-flop circuits of the registers. These flip-flop circuits are set or reset in synchronism with the clock pulses which are transmitted from the clock pulse generator 202.

Figure 4A:
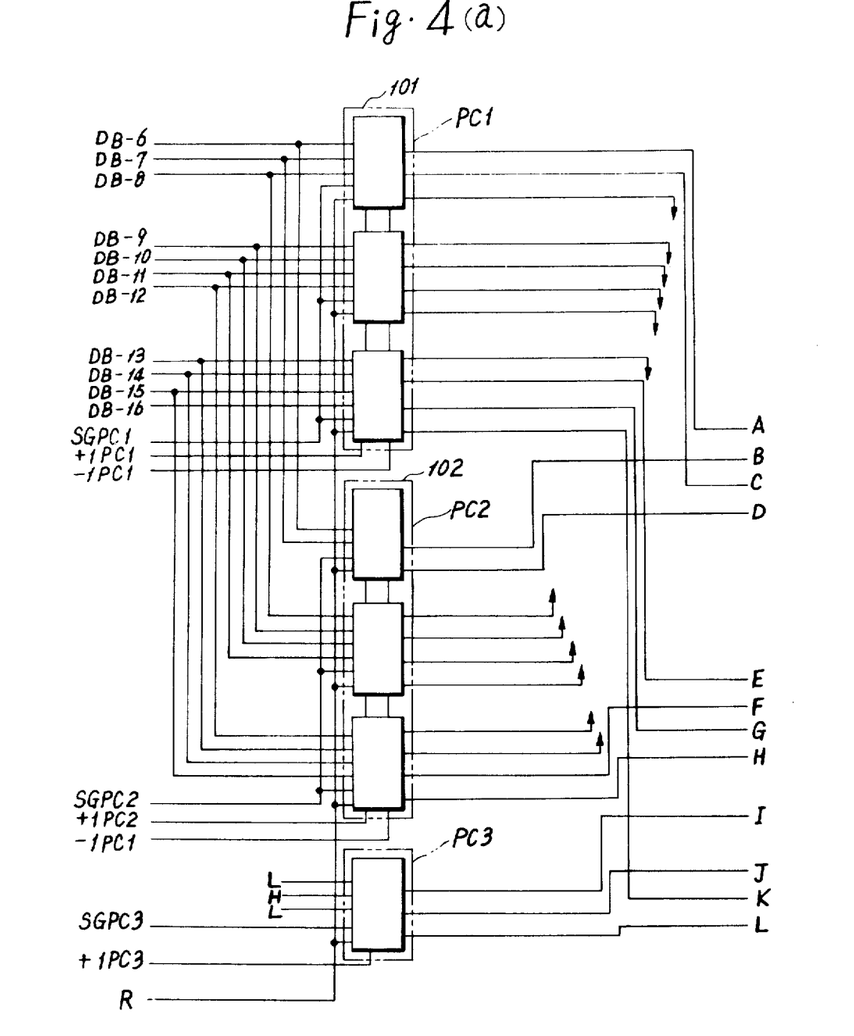
Figure 4B:
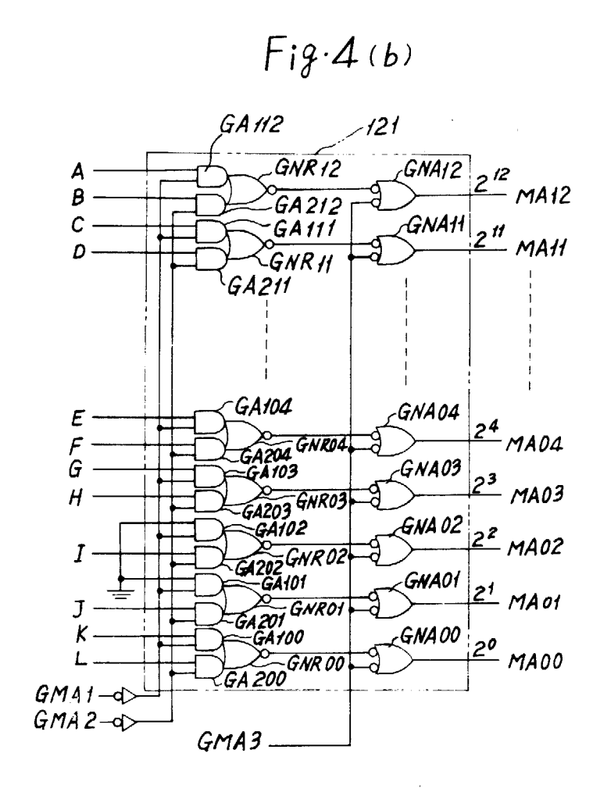

FIGS. 4a and 4b show the concrete circuit of the step counter 101, the point counter 102 and the memory address gate 121. The output terminals of the step counter 101 are connected to AND gates GA100 and GA103 to GA112, inclusive, except for AND gates GA101 and GA102 which are correspondingly connected to the memory address terminals MAO1 and MAO2. The input terminals of the AND gates GA101 and GA102 are connected to ground. The point counter 102 consists of two counters PC2 and PC3.

The output terminals of counter PC3 are connected to AND gates GA200, GA201 and GA202. The input terminals of the AND gates GA200, GA201 and GA202 are connected through an inverter to the control signal generating circuit 120. The gate pulse GMA2 is transmitted from the control signal generating circuit 120 to the above mentioned input terminals to open the AND gates GA200, GA201 and GA202. The other counter PC2 is connected to one input terminal of each of the AND gates GA203 to GA212, inclusive. The other input terminals of these AND gates are connected to the control signal generating circuit 120 through an inverter. The gate pulse GMA2 is transmitted from the control signal generating circuit 120 to the other input terminals to open the AND gates GA203 to GA212, inclusive. The AND gates GA100 to GA112 and GA200 to GA212 are connected to NAND gates GNA00 to GNA12 through NOR gates GNR00 to GNR12. Other input terminals of the NAND gates GNA00 to GNA12 are connected to the control signal generating circuit 120 to receive a gate pulse GMA3 which is transmitted from the control signal generating circuit 120. The NAND gates GNA00 to GNA 12 are opened when the gate pulse GMA3 is applied thereto. The memory address which is instructed by the step counter 101 is applied to the memory device 100 when the gate pulse GMA1 is applied to the AND gates. In this case the memory address terminals MA01 and MA02 turns on 0 state with no relation to the contents of the step counter 101. In case of the application of gate pulse GMA2, the memory address is instructed by the counters PC2 and PC3 of the point counter 102. The data input terminals of the counter PC1 are connected to the data lines DB-6 to DB-16, inclusive of the data bus DB. The data input terminals of the counter PC2 are connected to the data lines DB-6 to DB-15 of the data bus. Particular voltages designating a binary number 010 are applied to the data input terminals of the counter PC3, to which the binary number 010 is preset as an initial binary number in accordance with a preset pulse signal SGPC3.

Figure 5A:
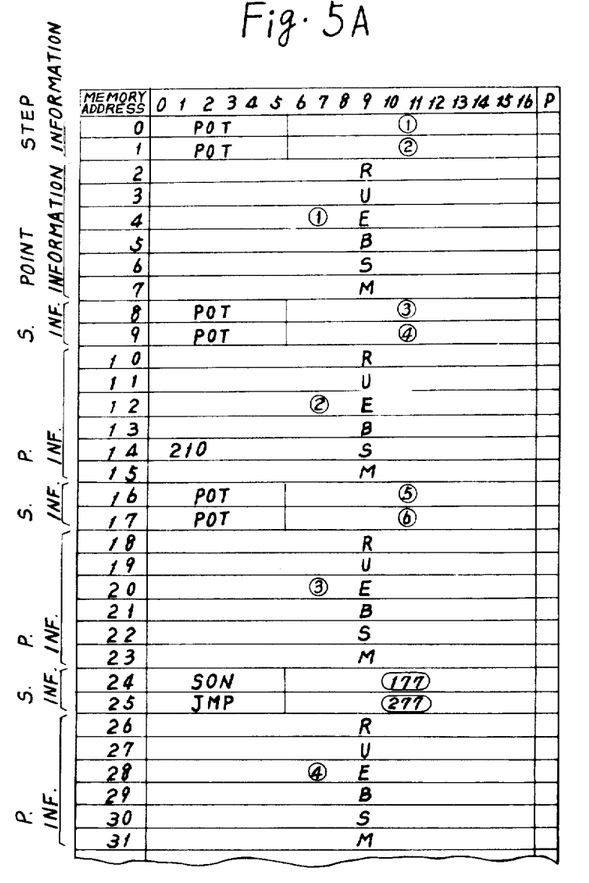
FIG. 5A is a schematic view showing an allotment of step and point informations with respect to memory addresses.
Figure 5B:
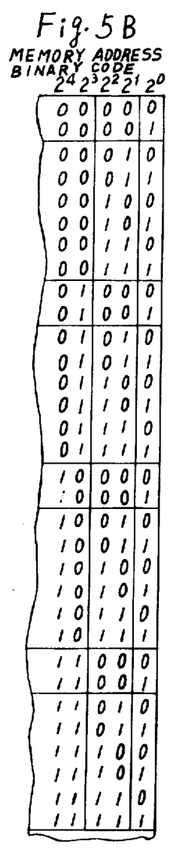
FIGS. 5B, 5C, 5D and 5E are schematic views showing the correspondences between memory addresses and the contents of each counter.
Figure 5C:
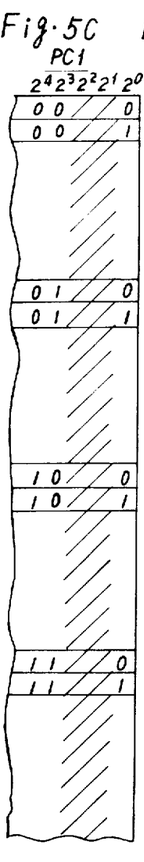
Figure 5D:
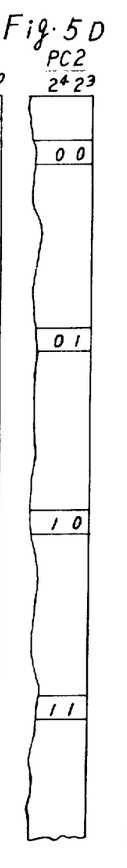
Figure 5E:
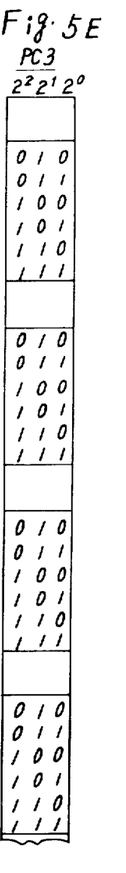

When the counter PC1 is stepped by the stepping pulse +1PC1, the memory address terminals MA00 and MA03 to MA12, inclusive, are instructed in accordance with the contents of the step counter PC1. Since the memory address terminals MA01 and MA02, then, are maintained in 0 state, the step information is read out from the memory addresses 0, 1, 8, 9, 10, 17 . . . , of the memory device 100, as schematically shown in FIGS. 5A and 5C. On the other hand, the memory address terminals MA03 to MA12 are instructed by the point counter PC2 and the memory address terminals MA00, MA01, and MA02 are instructed by the counter PC3. The counter PC3 starts to count up from the initial binary number 010 indicating the digital number 2 of the memory address when the stepping pulse +1PC3 is applied to the counter PC3. The memory address numbers 2 to 7, 10 to 15, 18 to 23, - - - of point information are instructed by the contents of the counters PC2 and PC3 in such a manner than one unit or one group of the point informations consisting of six words is read out, as shown in FIGS. 5D and 5E. Thus, predetermined memory addresses are rendered and allotted to the step information and the point information, as schematically shown in FIG. 5A. The memory addresses of the predetermined step information allotted as above-mentioned are instructed in order by applying only the stepping pulse +PC1 to the step counter 101, so that the instruction of a memory address can be easily performed in reading and writing. With reference to the point information, the memory address of the first word, e.g. 00 010, 01 010, 10 010, - - - , FIGS. 5D and 5E, is instructed by the counter PC2 and each group of the point informations consisting of six words, e.g. 00 010 (for R-axis), 00 011 (for U-axis), - - - , and 00 111 (for M-function), is read and written by stepping of the counter PC3 in synchronism with the stepping pulse +1PC3. Also in this case, a particular memory address of the point information is instructed by stepping only the counters PC2 and PC3, so that it is easy in programming to instruct the memory address of each information and therefore special considerations in programming are not necessary. Thus, with the present invention the step information and the point information can be rationally memorized in the memory device 100.

Figure 6:
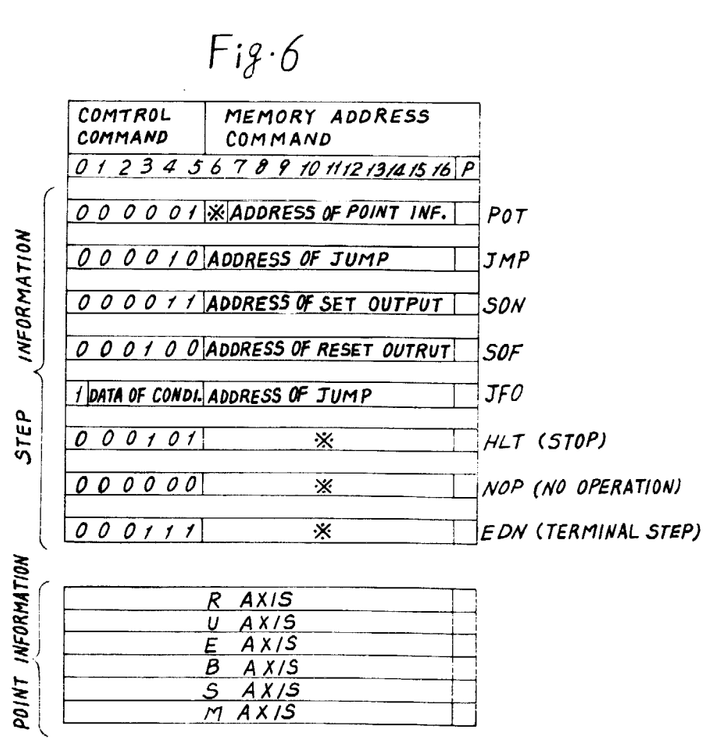
FIG. 6 is a schematic view showing various types of command words of the step informations and various types of point informations.

Each type of step information is coded by binary digits and is illustrated in the upper table of FIG. 6 wherein a control command POT to instruct the reading of a point information is designated by a binary number 000001. In the same step information the memory address of point information to be read out is similarly designated by a binary number. Once the point information is instructed, a group of point informations consisting of six words, shown in the lower table of FIG. 6, is continuously read out from the memory device 100 to be preset to the command value register 200, as described hereinbefore. An unconditional jump command JMP, coded by a binary number 000010 is provided together with a memory address command which instructs the memory address of a step information, which is to be next read out. The step information is read by jumping informations located on the way and is preset to the step counter 101. An unconditional output setting command SON, coded by a binary number 000011 is applied together with a set output address command which is applied to an output card 107, FIG. 3(a). The output card 107 comprises a plurality of flip-flop circuits (not shown), which are identified by their particular output address number, for converting a set or reset signal of the program control device such as a low direct current voltage signal to a high alternating or a direct current voltage signal adequate for external equipment. The flip-flop circuit which is instructed in accordance with the output address number is reset to control the external equipment. At the same time, an unconditional output resetting command SOF, coded by a binary number 000100, is applied together with a reset address command. The flip-flop circuit which is instructed in accordance with the reset address command is reset to control the external equipment. A conditional jumping command JFO is applied together with a command data coded by a binary number and the memory address of a step information which is to be next read. The memory address is read by jumping informations located on the way and is preset to the step counter 101 in case only a programmed condition given by the command data is satisfied. The conditional jumping command JFO is designated by the first binary digit 1 and includes the conditional data coded by a binary number following the first digit 1 therein. A step command HLT, a no-operation command NOP and a final step command EDN are coded by binary numbers 000101, 000000 and 000111, respectively. Step informations having these three commands are not necessary for having address informations therein. A sign ·✷· designates that binary digits in the memory address command shown by the sign ·✷· for convenience sake are disregarded in reading. Since six bits are prepared for command words, each kind of and other commands can be coded in addition to the aforementioned representative commands as occasion demands. As a result, a very wide scope of function can be rendered to the program control device. Furthermore, with the present invention only one memory word is enough for each step information. Thus, the memory device 100 can be effectively used.

By way of precaution against electric power source troubles such as a service interruption, the contents of the step counter 101 is also memorized in the stationary address of the memory device 100, in response to the gate pulse GMA3 which is applied to the memory address gate 121 immediately after the step information is preset to the instruction register 103. The stationary address in the memory device 100 is instructed when all memory address terminals MA00 to MA12, inclusive, are turned to 1 state through NAND gates GNR00 to GNR12, inclusive, as shown in FIG. 4(b) and described hereinafter. A gate pulse GPC1, FIG. 3(a) is applied to a gate 105 at the same time with the gate pulse GMA3 to thereby open the same. As a result, the contents of the step counter 101 is transmitted to the data bus through the gate 105. When the memory start pulse MST is applied to the memory device 100, the content of the step counter 101 is applied to the writing terminal WIF of the memory device 100 to be memorized in the stationary address which is instructed in accordance with the gate pulse GMA3. Such a memorizing operation of the stationary address is performed each time the step information is read out. Thus, with the present invention there is no fear as to what step of operation has been advanced to in the industrial robot 10 even when electric power is stopped by accident.

The contents of the step counter 101 which is memorized at the stationary address is positively read out before re-start by restoration of the power source, as described hereunder.

The gate pulse GMA 3 is applied to the memory address gate 121 to instruct the stationary address and the memory start pulse MST is applied to the memory 100, so that the contents of the stationary address are read out. When the gate pulse GM is applied to the memory gate 122, the contents which are read out from the memory 100 are transmitted to the data bus DB and in turn to the step counter 101 to which the data preset pulse SGPC1 is applied. The step number immediately before the service interruption is preset to the step counter 101. Thus, the following operations of the industrial robot 10 are exactly continued even after the restoration of the service interruption of electric power.

The teaching operation is described hereunder with reference to FIG. 3(a) wherein a numeral 220 designates a teaching circuit consisting of each kind of switch, for example, such as a command write-in switch 221, a miscellaneous function switch 223 and the like. Switches for energizing the coils to operate the control ports of the servo valves 26, 28, 30, 32 and 34 are not shown for convenience sake since such switches are not necessary to set forth the present invention. The command write-in switch 221 is connected to the data bus DB through a gate circuit 222. The miscellaneous function switch 223 is connected to the data bus DB through a gate circuit 224 which is connected to the encoders 27, 29, 31, 33 and 35 for the R, U, E, B and S axes.

Before the teaching operation, the step counter 101 and the point counter 102 are reset by a reset signal R, FIG. 4(a), and the command write-in switch 221 and the miscellaneous function switch 223 are set in accordance with the contents of an operation to be controlled. When the point information reading-out command POT is written in the memory device 100, a servo valve operation switch (not shown) is preliminary operated so as to position the fingers 22 to a predetermined position. When a memory button (not shown) is pushed in this situation, the contents of the command write-in switch 221 and the contents of the counter PC2 are applied to the write-in terminal WIF of the memory 100 through the data bus DB, so that a step information as the first step is written in the memory device 100 when the memory start signal MST is applied to the memory device 100. Next, the memory address gate 121 is changed by the gate pulse GMA2 so that the counters PC2 and PC3 of the point counter 102 instruct a memory address to the memory device 100. The actual position value Q of the encoder 27 for the R axis is applied to the memory writein terminal WIF through the gate circuit 224, which is opened by a gate pulse signal GWP1, and the data bus DB. The actual position value Q is memorized at the instructed memory address when the memory start pulse MST is applied to the memory device 100. The next memory address is instructed by the application of stepping pulse +1PC3 to the counter PC3. When the gate 234 is opened by a gate pulse signal GWP2, the actual position value of the encoder 29 for the U-axis is memorized in the memory device 100. Similarly, the actual position values of the E, B and S axes and the miscellaneous function M are written in the memory device 100 as the point information. Hereinafter, the step counter 101 and the point counter 102 (the counter PC2) are stepped by one. The second step information and the point information are written in at the memory addresses which are instructed by the counters 101 and 102. When only the step information is written in the memory device 100, only the step counter 101 is stepped and the command word and the address to be next read or the contents of the switch to instruct an output address are written in. In this case, the point counter 102 is not stepped, so that memory space for point information is not necessary. As mentioned above, when the point reading-out command POT is applied as a step information, a point information is automatically memorized at a predetermined memory address by the stepping of the point counter 102 even if an operator does not instruct the memory address of the point information. Also, when the same information is repeatedly used, the address data of the point information which is set by a multi switch is written in as a step information together with the point reading-out command.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A program control device for controlling a plurality of power units of a controlled object having operation member means in accordance with program information comprising:
    memory means for memorizing said program information in predetermined memory addresses therein, said program information consisting of step information and point information;
    step counter means for instructing a memory address of the step information to said memory means, said step information including a memory address command to instruct a memory address of the point information and a control command to control functions of said program control device;
    point counter means for instructing a memory address of the point information to said memory means in accordance with said memory address command;
    control signal generating circuit means for generating control signals in accordance with said control command;
    gate means for selectively connecting said step counter means and said point counter means to said memory means in response to said control signals; and
    control means for controlling said power units in accordance with the point informations which have been read out from said memory addresses instructed by said point counter means.

2. A program control device according to claim 1, further comprising:
    an instruction register for registering said step information read out from said memory means, the memory address command of said step information being applied to said point counter in response to said control signals; and
    an instruction decoder connected to said instruction register for decoding the control command of said step information to apply the same to said control signal generating circuit means.

3. A program control device according to claim 1, wherein said point information indicates a command positional value of said operation member means in each of the operational axes of the same.

4. A program control device according to claim 3, wherein said control means comprises:
    register means for registering said command positional values;
    detecting means for obtaining actual positional values by detecting the movement of said operation member means; and,
    comparator means for comparing said actual positional values with said command positional values to generate operational control signals, said power units being controlled in accordance with said operational control signals.

5. A program control device according to claim 1, wherein said gate means comprises:
    first gate means for connecting said step counter means with said memory means in response to said control signals; and
    second gate means for connecting said point counter means with said memory means in response to said control signals.

6. A program control device according to claim 5, wherein said memory means has a plurality of memory address terminals corresponding to binary digits, respectively, said memory address being instructed by the selective application of binary coded electric signals to said memory address terminals.

7. A program control device according to claim 6, wherein said first gate means has a plurality of input terminals corresponding to said memory address terminals, respectively, at least one input terminal corresponding to a predetermined binary digit being grounded and the remaining input terminals being connected to said step counter means so as to instruct the memory address of step information at a regular interval.

8. A program control device according to claim 6, wherein said second gate means has a plurality of input terminals correspoinding to said memory address terminals.

9. A program control device according to claim 8, wherein said point counter means comprises:
    first counter means connected to a part of the input terminals; and
    second counter means connected to the remaining input terminals.

* * * * *